United States Patent

[11] 3,576,428

[72] Inventors Christos B. Kapsambelis
Canton;
Francis H. Stites, Wayland, Mass.
[21] Appl. No. 634,188
[22] Filed Apr. 27, 1967
[45] Patented Apr. 27, 1971
[73] Assignee Sylvania Electric Products, Inc.

[54] WIDEBAND LABEL READING APPARATUS
7 Claims, 4 Drawing Figs.

[52] U.S. Cl. .......... 235/61.11E, 235/61.12
[51] Int. Cl. .......... G06k 7/12
[50] Field of Search .......... 235/61.115, 61.12; 340/146.3, 146.3 (XX), (Railroad Digest); 250/219 (RG), 219 (ICR); 246/3, 4, 5, 6

[56] References Cited
UNITED STATES PATENTS

| | | | |
|---|---|---|---|
| 2,745,093 | 5/1956 | Holman et al. .......... | 340/332 |
| 3,238,358 | 3/1966 | Read .......... | 235/61.12 |
| 3,417,231 | 12/1968 | Stites et al. .......... | 235/61.115 |

*Primary Examiner*—Daryl W. Cook
*Assistant Examiner*—William W. Cochran
*Attorneys*—Norman J. O'Malley and Elmer J. Nealon

ABSTRACT: An electro-optical label reading system having relatively wide depth of field and employing a label coded in a two-position and three-position quadricolor code via combinations of orange, blue, white and black retroreflective stripes, with a third stripe added to those combinations in which the second stripe is ordinarily black, to prevent processing of spurious signals. The first stripe of each combination is one unit high and the second stripe is two units high, while in those combinations having an added stripe each of the three stripes is one unit high. The third stripe produces a signal which is processed by the decoding logic along with data pulses to prevent the processing of spurious signals which could enter the system but for the added stripe. The signal from this first stripe is deleted from the readout of the data to retain compatibility with signals from the two-stripe combinations.

INVENTORS.
FRANCIS H. STITES and
CHRISTOS B. KAPSAMBELIS

BY Stanley M. Schurgin
ATTORNEY.

INVENTORS.
FRANCIS H. STITES and
CHRISTOS B. KAPSAMBELIS

BY Stanley M. Schurgin
ATTORNEY.

WIDEBAND LABEL READING APPARATUS

BACKGROUND OF THE INVENTION

This invention relates to label reading systems, and in particular to an electro-optical system useful, for example, in reading labels affixed to and identifying transportation vehicles.

An electro-optical label reading system is described in U.S. Pat. No. 3,225,177, assigned to the Assignee of the present application, which is operative to read coded labels affixed to vehicles passing a scanning station and to decode the data content of these labels in order to ascertain the identity of vehicles passing the scanner. The labels are fabricated from colored stripes of retroreflective material and are coded in a two-position base four code by various two-stripe combinations of orange, blue, white and black stripes to represent start and stop words and the decimal digits one through zero. These stripes are of substantially equal width and are mounted in a vertical succession of horizontally oriented stripes on the side of the vehicle, each two-stripe combination being separated from adjacent ones by a black stripe. An important feature of the particular code employed is the use of black stripes as one "color" of the code. The black stripes are used only as the second stripe in the two-stripe combinations because system timing pulses are initiated by light reflected from the first stripe of every two-stripe combination, and the black stripes are essentially nonreflective.

To read a label passing a scanning station, a source of light at the scanning station is vertically scanned from bottom to top across the label, and light reflected from the label is received by the scanner and divided by a dichroic optical system into two light beams which are received by respective photosensors. One photosensor is responsive to orange light while the other is responsive to blue light. Thus, respective orange and blue sensors are activated by light reflected from the orange and blue label strips while light reflected from white stripes activates both photosensors. The absence of significant reflection from the black stripes produces no signal at the photosensors and, as stated above, this absence of signal is also employed in the decoding process. The resultant signals from the photosensors are decoded by logic circuitry to provide an alphanumeric output representing the information contained in the label. Threshold circuitry is employed within the logic circuit to provide so-called guardbands between coded signal combinations, corresponding to coded stripe combinations, to prevent spurious signals from being processed.

The depth of field of a label reading system such as the one described above is a function of the variation in pulse width caused by a change in distance between the label and the scanner. Since the two-stripe combinations are composed of stripes of equal height, the theoretical maximum variation in distance between the label and scanner is 2:1; corresponding to a 2:1 variation in pulse width. For example, a stripe of a given height located at a minimum distance from the scanner and a stripe twice this height located at twice the distance from the scanner will each produce a pulse of substantially the same width and the decoding system could not, therefore, distinguish between the wide and narrow stripes. This 2:1 depth of field is quite adequate for many applications, for example, for use in identifying labeled railroad cars passing on a track past a scanning unit. In some instances, however, such as for use in reading cars, trucks or busses travelling on a roadway, it would be advantageous to have, and it is an object of the present invention to provide, a system having increased depth of field so that label identification can be achieved with relatively large variations in the distance between label and scanner.

SUMMARY OF THE INVENTION

Briefly, the present invention employs a label containing two-stripe coded combinations of retroreflective stripes wherein the second stripe of certain two-stripe combinations is twice the height of the first stripe and wherein a third stripe is added to certain other coded combinations. Coding is accomplished as in the system described above via combinations of orange, blue, white and black stripes. In those combinations coded with orange, blue or white, two-stripe combinations are employed, with the second colored stripe being twice the height of the first stripe. However, in those coded combinations wherein black is the second stripe, black is employed as a second stripe of the same height as the first stripe, and a third colored stripe is employed having the same height as the previous individual stripes. The first stripe is employed to initiate timing pulses in the decoding logic and to generate guardbands, while the third stripe generates the signal to be stored and used to identify the vehicle.

The logic circuitry, which will be described in detail hereinafter, receives the signals caused by the three stripes of the three-stripe combinations and to convert the three-position coded signals thus received to a two-position coded format for subsequent decoding and processing. Relatively wide depth of field is achieved by virtue of the judicious choice of stripe heights and the use of ancillary stripes to prevent the processing of spurious signals which might otherwise impair accurate system operation.

DESCRIPTION OF THE DRAWINGS

The invention is more fully described in the following detailed description, taken in conjunction with the accompanying drawings, in which.

DESCRIPTION OF A PREFERRED EMBODIMENT

Figure 1:
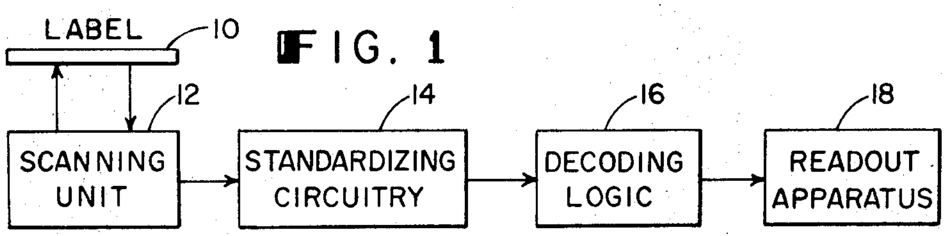
FIG. 1 is a block diagram of a label reading system of a type with which the present invention is useful.

FIG. 1 is a block diagram of a label reading system, of the type described in the aforementioned patent, wherein a light beam from a scanning unit 12 is caused to can a coded label 10 affixed, for example, on the side of a vehicle passing the scanner. Light reflected from the label is received by the scanning unit and is transduced into electrical signals which are applied to the normalizing or standardizing circuitry 14 which removes essentially all distortion and provides standardized pulses representative of the coded label information. The standardized pulses are decoded by decoding logic circuitry 16 whose output signal operates readout apparatus 18 such as a teletypewriter.

The label is composed of two-stripes and three-stripe combinations of orange, blue, white and black stripes, each combination being separated from the next combination by a black stripe. To prevent noise, due to reflections from these black stripes separating the two-stripe combinations, from entering the decoding circuits, so-called "guardbands" are generated within the standardizer unit 14. The generation of these guardbands will be discussed in detail subsequently but in brief the signal pulse from the scanner is stretched and attenuated and then compared to a delayed version of itself. The portion of the stretched pulse preceding and following the delayed pulse generates a threshold which prevents noise pulses from passing through a comparator and being processed by the decoding circuitry.

The depth of field of such label reading systems is limited by the ratio of the heights of the stripes comprising the coded digits, in particular the height ratio of the stripes in those digits composed of the same color. For example, a digit encoded with first and second orange stripes of equal height is not ascertainable beyond a 2:1 viewing distance, as the double orange stripes at the greater distance would produce a signal pulse having the same width as from a single orange stripe viewed at half the distance. The decoding logic cannot, therefore, distinguish whether the coded digit is one having a single orange stripe with a black stripe, or one with two orange stripes. The depth of field could be increased by employing a label coded via stripes of greater height ratios, say 3:1, wherein the first stripe of each digit is of a first height and the second stripe is of twice that height, However, in those digits whose code has a second black stripe, the logic cannot be properly gated to prevent spurious signals from entering the decoding circuitry and causing erroneous signal processing.

According to the invention, a third colored stripe is added to those digits which ordinarily would be encoded with a second wide black stripe, and this third stripe functions in the system to allow efficient and accurate decoding of those digits by supplying a controlled signal to the logic which is operative to exclude the spurious signals from the logic.

Figure 2:
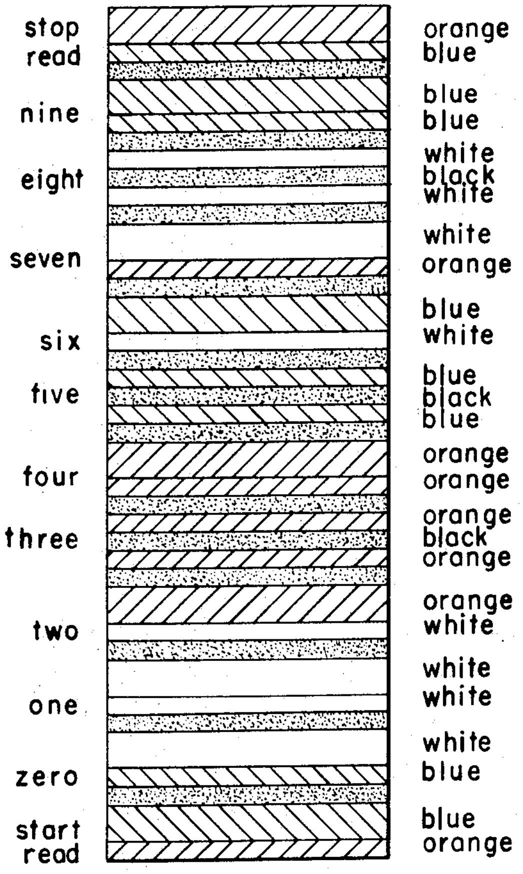
FIG. 2 is a diagrammatic representation of a label according to the invention.

A label according to the invention is illustrated in FIG. 2 wherein the start read code, stop read code and digits zero through nine are represented by either a two- or three-stripe combination of blue, orange, white and black stripes. The start read and stop read codes provide an indication to the decoding system of the duration within which label data occurs. Acceptance gates for ascertaining the validity of a label are energized by three start and stop codes and are described in the aforementioned U.S. Pat. No. 3,225,177, and copending application Ser. No. 386,328, filed July 10, 1964 now U.S. Pat. No. 3,417,231. The first stripe of each coded combination is encoded with the colors blue, orange or white, while the second stripe is encoded with the colors blue, orange, white or black. The height of the first stripe is one unit high while the height of the second stripe is two units high for all coded digits except those where the second coded stripe would be, but for the invention, black, in which case, the black stripe is one unit high, as is the third stripe. In the particular code illustrated in the drawing, the digits three, five and eight have a black second stripe and are, therefore, modified as described herein. While the color of the first and third stripes within any three-stripe combinations are shown in FIG. 2 to be the same, the first stripe can also be white in lieu of the color shown. The only function of the first stripe in the three-stripe combination is to cause a signal to be produced which will energize appropriate timing circuits and initiate suitable threshold circuitry to allow accurate decoding.

In addition to providing timing and thresholding the pulse from the first stripe in a two-stripe combination forms the first bit in the two-position code. In both the two- and three-stripe combinations the second stripe provides data for the second-bit position of the encoded label digit. The first- bit position of the encoded three-stripe digit is provided by the third stripe.

Figure 3:
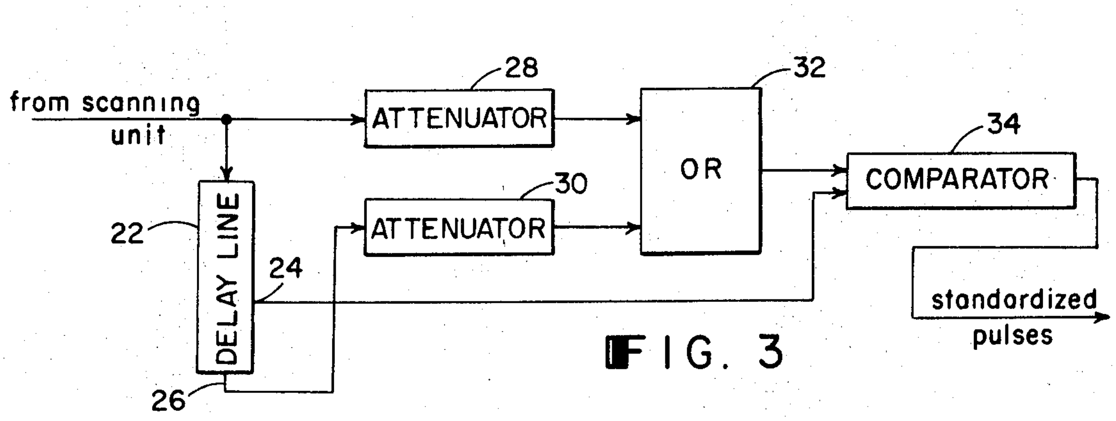
FIG. 3 is a block diagram of circuitry useful to decode the data content of a label.

To further understand the need for an additional stripe and the concept of guardbands, a more detailed explanation of the standardizing circuit is given hereinbelow. The standardizing circuit 14, shown in greater detail in FIG. 3, is of the type disclosed and claimed in U.S. Pat. No. 3,299,271 and is operative to measure the pulse width of signals transduced from the label and to generate guardbands between coded stripe combinations. The standardizing circuit includes a delay line 22 having a first output tap 24 at its center and a second output tap 26 at its far end, the delay at tap 26 being twice that at the center tap, a pair of attenuators 28 and 30 designed to reduce by half the amplitude of the respective signals applied thereto, an OR circuit 32 and a comparator circuit 34. A separate standardizing circuit is provided for the orange and blue signal channels. Signals from one channel of the scanning unit are applied via attenuator 28 to one input of OR circuit 32, while a delayed version of the input signal appearing at the output tap 26 is applied through attenuator 30 to the second input terminal of the OR circuit. As is well known, an OR circuit produces an output signal when a signal is applied to either of its input terminals. Accordingly, the output of the OR circuit is a pulse of the amplitude of the attenuated input signal, because of attenuation by attenuators 28 and 30 and which is wider than the input signal by the amount of the time delay of delay line 22. This signal is applied to one of the input terminals of comparator 34, and the signal appearing at the center tap 24 of the delay line is applied, without attenuation, to the second input terminal of comparator 34. The comparator determines the difference in width between the signal from OR circuit 32 and the delay pulse from center tap 24 and produces a pulse that is determined by the crossover points of the two pulses, which occur at the midpoint width of the delayed signal pulse from tap 24, regardless of its amplitude. A threshold level equal to one-half the amplitude of the input signal pulse is set in comparator 34 by the signal from OR circuit 32.

Thus, any output pulse from the delay line center tap 24 triggers the comparator if and when the leading and trailing edges pass the threshold level set the the stretched pulse. The fact that the signal from the center tap starts a predetermined time after the leading edge of the stretched pulse and similarly, ends a predetermined time before the trailing edge of the stretched pulse affords the so-called guardbands. These guardbands prevent small amplitude signals which may occur within the guardband interval immediately preceding or following the signal pulse from producing an output at comparator 34, and are generated only when there is a signal pulse in one or both of the signal channels. For those digits with the extended black stripe, there is no light reflected from the label and thus no signal generated in either of the two channels. Thus, no guardbands are generated during the time that the scanner is viewing the black stripe, thereby rendering the system susceptible to noise pulses occurring during this period.

As discussed hereinabove, to obviate this noise problem, the extended black stripe is reduced to one unit in height and a colored stripe one unit high is added. The effect of the additional strips is twofold; namely, to provide a controllable signal pulse to the exclusion of noise, and to generate guardbands to cover the period immediately preceding and following the controllable signal pulse. The decoding logic 16 converts the format of the data derived from the three-stripe combination to a format similar to that of the data received from the two-stripe combination. This conversion makes the three-stripe data compatible with the two-stripe data and facilitates subsequent data processing.

Figure 4:
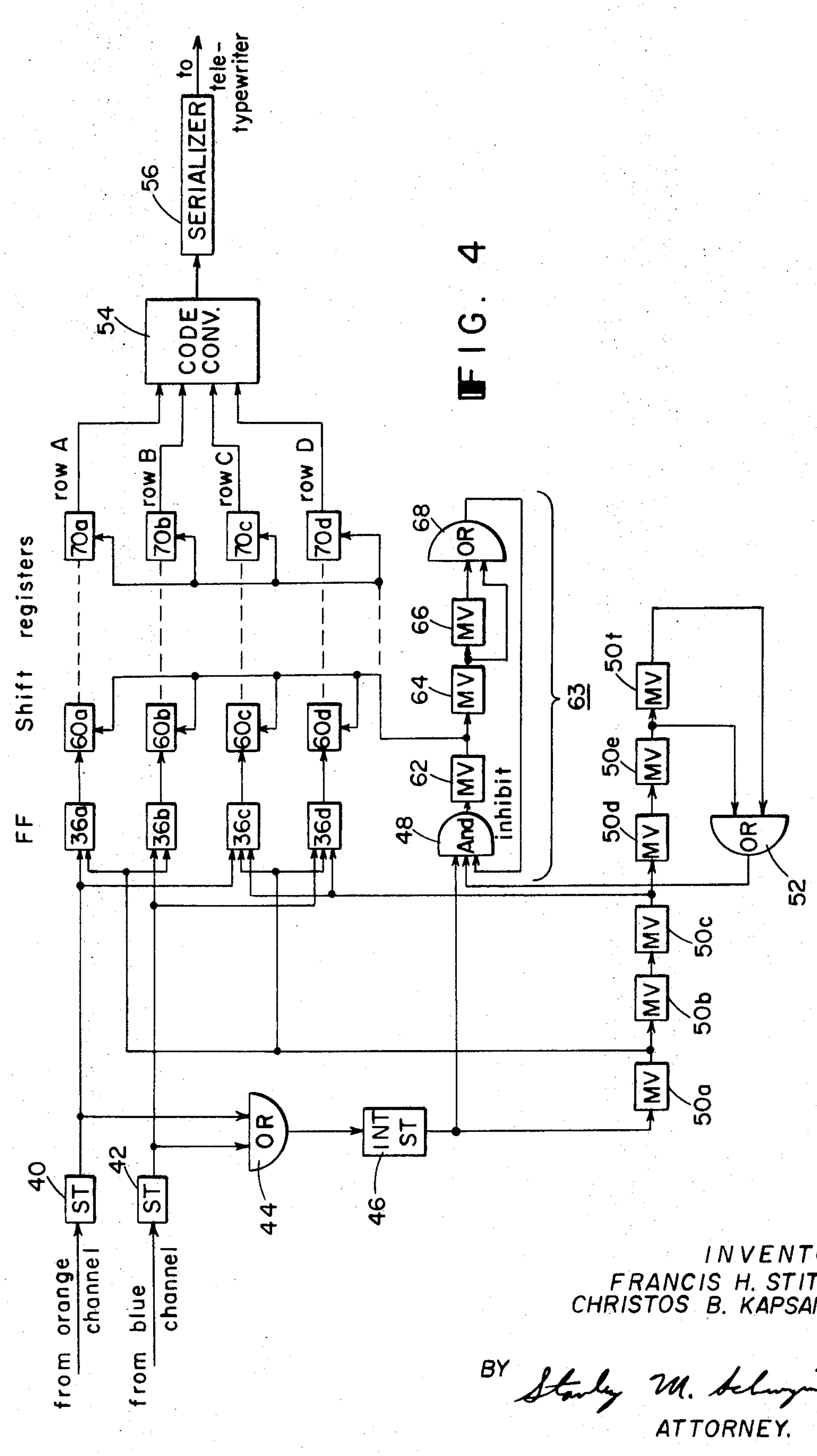
FIG. 4 is a block diagram of decoding logic according to the invention.

The logic circuitry operative to decode the label is depicted in FIG. 4 and includes four rows of shift registers, appropriate timing circuits and acceptance gates. The shift registers of row A and row C are connected to the orange channel and the shift registers of row B and row D are connected to the blue channel. Each shift register contains a number of stages equal to the number of digits in the label being decoded. The loading sequence of signal pulses into the shift registers is considered for two cases; first for the case where digits do not have a black stripe as the second color, and secondly for the case where the digits have a black stripe as the second color.

The normalized signal pulses from standardizing circuitry 14 of each channel are applied to Schmitt triggers 40 and 42 which are responsive to signal pulses from respective orange and blue channels of the scanning unit. Schmitt trigger 40 applied signals from the orange channel to the shift registers in row A and row C while Schmitt trigger 42 applies signals from the blue channel to the shift registers in row B and row D. A pulse from Schmitt trigger 40 sets flip-flops 36*a* and 36*c*, while a pulse from Schmitt trigger 42 sets flip-flops 36*b* and 36*d*. Pulses from the Schmitt triggers 40 and 42 are also applied to an OR gate 44, the output pulse of which is applied to an input terminal of an integrator Schmitt 46, the purpose of which is to eliminate pulses of less than a predetermined width such as noise pulses which may enter the system. The output terminal of the integrator Schmitt 46 is connected to an AND gate 48 and to a bank of six one-shot multivibrators 50*a*—50*f*. When the leading edge of a pulse appears at the output of the integrator Schmitt 46, a first loading gate pulse is generated by one-shot multivibrator 50*a*, the trailing edge of this gate pulse causing the orange or blue channel signal pulses from a first label stripe to be recorded in flip-flops 36*a* and 36*b*, respectively, or in both flip-flops if the first stripe is white, and causing any information stored in flip-flops 36*c* and 36*d* to be erased. The trailing edge of the first gate pulse also causes a space gate pulse to be generated by multivibrator 50*b* of a duration corresponding to the time it takes the scanned light beam to traverse the second stripe of a coded label combination. The trailing edge of the space gate pulse generated by one shot 50*b* initiated a second loading gate pulse from a one shot 50*c*, causing the data pulse from the second stripe to be loaded into flip-flops 36*c* and 36*d* for temporary storage. The trailing edge of the loading gate pulse also triggers a fourth one-shot multivibrator 50*d* which generates a second space gate pulse to prevent the coincidence of a loading pulse and a shifting pulse to flip-flops 36*c* and 36*d*. The trailing edge of the pulse generated by multivibrator 50*d* initiates a shift acceptance gate pulse generated by the series combination of two one-shot multivibrators 50*e* and 50*f*, with the output of each of these multivibrators connected to an OR gate 52. The output of the OR gate 52 is connected to an input of AND gate 48. Typical values for multivibrators 50*a* through 50*d* are as follows: a 3-microsecond delay is provided by one shot 50*a* to insure that the scanner has scanned into the first stripe before the signal return from this stripe is stored. A 17-microsecond delay is provided by the combination of one shots 50*b* and 50*c* to insure that the signal return is in fact a signal pulse from the second stripe. A 4-microsecond delay is provided by one shot 50*d* to guarantee that a shift pulse will not be generated contemporaneously with the shifting in of the data to flip-flops 36*c* and 36*d*. A delay of 0 to 40 microseconds is provided by the combination of 50*b* and 50*f* corresponding to the possible variations in time of the receipt of pulses from the second data stripe caused by variations in depth of field. If the trailing edge of the output pulse from integrator Schmitt 46 occurs within the period of the shift acceptance gate pulse which is substantially equal to the duration of the longest signal pulse train from a coded combination and no inhibit signal from OR gate 52 (to be discussed hereinafter) is present at AND gate 48, a shift pulse is generated which is operative to shift the data temporarily stored in flip-flops 36*a*—36*d* into respective shift registers 60*a*—60*d*.

The data stored in shift registers 60*a*—60*d* is transferred in the well-known manner through successive register stages and from final registers 70*a*—70*d* to a code converter 54, which converts the four-level parallel data to a five-level parallel teletypewriter code format. This five-level code is transformed to a serial code in serializer 56 for operation of a teletypewriter which prints out the decoded label data.

The above description is of the operating sequence necessary to process the data from a digit composed of a first stripe one unit high and a second stripe two units high where the second stripe is not black. For those digits composed of three stripes each one unit high wherein the first stripe is a color (not black), the second stripe is black and the third stripe is a color (not black), the logic circuitry functions as follows: The leading edge of the output pulse from the integrator Schmitt 46 initiates the first loading gate pulse generated by one-shot multivibrator 50*a*. The trailing edge of the first loading gate pulse loads the data pulse from the first colored stripe in flip-flop 36*a* if the first stripe is orange, in 36*b* if the first stripe is blue and in both 36*a* and 36*b* if the first stripe is white. The trailing edge of the first loading gate also erases any information stored in flip-flops 36*c* and 36*d*. Following the first space gate pulse, which is initiated by the trailing edge of the first loading gate pulse and generated by multivibrator 50*b*, a second loading gate pulse is generated by multivibrator 50 *c*. The function of the second loading pulse is to load data from the orange and blue channel due to the second label stripe into flip-flops 36*c* and 36*d* respectively, and to initiate a space gate pulse generated by one-shot multivibrator 50*d*. The trailing edge of this space gate also initiates the shift acceptance pulse generated by the one shot multivibrators 50*e* and 50*f* and applied to an AND gate 48.

As pointed out for the two-stripe case, a shift pulse, required to shift the data stored in flip-flops 36*a*—36*d* is generated when the trailing edge of the output pulse from integrator Schmitt 46 is coincident at the input to AND gate 48 with the shift acceptance pulse from OR gate 52. Because the second stripe in the three-stripe combination is black and no light is reflected to the sensors, there is no data pulse generated to energize integrator Schmitt 46. As a result, the trailing edge of the integrator Schmitt output pulse, which was generated by light reflected from the first stripe, will occur prior to the occurrence of the shift acceptance pulse from OR gate 52. Thus, there is no coincidence at AND gate 48 necessary to generate a shift pulse operative to cause the data stored in flip-flops 36*a*—36*d* to be shifted into respective shift registers 60*a*—60*d*.

When the next data pulse, generated as a result of light being reflected from the third stripe occurs, integrator Schmitt 46 again has an output, and the leading edge of this output pulse initiates a first loading gate pulse generated by one-shot multivibrator 50*a*. The trailing edge of this loading gate pulse loads the data from the third colored stripe in flip-flop 36*a* if the first stripe is orange, in 36*b* if the third stripe is blue and in both 36*a* and 36*b* if the third stripe is white and also resets 36*c* and 36*d* to zero. When the trailing edge of the output pulse from trigger 46 occurs, there is coincidence with the shift acceptance pulse (described above) at AND gate 48. The output pulse from AND gate 48 triggers a multivibrator 62 which generates a valid shift pulse to transfer the data from flip-flops 36*a*—36 to shift registers 60*a*—60*d* respectively.

A third input to AND gate 48 is generated by an inhibit circuit 63, comprising two one-shot multivibrators, 64 and 66 and an OR gate 68. The function of the inhibit circuit 63 is to prevent the generator of another shift pulse for a fixed period after a valid shift pulse has occurred. The shift pulse rate is, of course, determined by the rate at which the coded combinations of stripes are scanned by the scanner. In a typical system, a single stripe is scanned in 20 microseconds, and the shift pulse rate is set at 40 microseconds to assure that data is loaded into flip-flops 36*a*—36*d* before a shift pulse can occur. Practical multivibrators having a 40-microsecond delay which can be retriggered immediately after turnoff are not commercially available, and it is common practice to employ a pair of series connected multivibrators, such as 64 and 66, each having a 20-microsecond delay, coupled via an OR gate 68 to provide the total required delay.

The same sequence of operations is continued for each signal pulse returned from the label. In the well-known manner, the data in the shift registers is advanced by one stage as new data is entered into the registers until the complete label data is loaded into the registers. When the contents of the entire label have been entered into the shift registers, the data is transferred bit by bit from register stages 70*a*—70*d* to a code converter 54 and thence to a serializer 56. The code converter 54 transforms the four-level parallel data to a five-level parallel code suitable for operating a teletypewriter and the serializer 56 transforms the parallel code to a serial code necessary to activate the teletypewriter. The converter and serializer are of the type described in copending application Ser. No. 386,328, filed July 30, 1964, now U.S. Pat. No. 3,417,231.

From the foregoing, it is evident that a reliable and efficient label reading system having a relatively wide depth of field has been provided. Although a preferred embodiment of the invention has been shown and described, modifications and alternative implementations will occur to those skilled in the art without departing from the true scope of the invention. Accordingly, the invention is not to be limited by what has been particularly shown and described except as indicated in the appended claims.

We claim:

1. An electro-optical label reading system comprising a vertical array of substantially parallel horizontally oriented reflective stripes coded in a combination of two stripes and three stripes, each of said stripes being selected from a predetermined group of colors, scanning means operative to scan a light beam across said reflective stripes, means for generating electrical signals in response to light reflected from said stripes, and means operative in response to said electrical signals to decode the data content of said stripes and including converter means to convert the format of the electrical signals generated in response to light reflected from the three-stripe combination to the digital format of the electrical signals generated in response to the light reflected from the two-stripe combinations.

2. An electro-optical label reading system according to claim 1 wherein data is encoded in a vertical array of horizontally oriented reflective stripes in accordance with the following table;

| Data | Stripe combination | Height of stripes in units |
|---|---|---|
| Start read | Orange, blue | Orange 1, blue 2. |
| 0 | Blue, white | Blue 1, white 2. |
| 1 | White, white | White 1, white 2. |
| 2 | White, orange | White 1, orange 2. |
| 3 | Orange, black, orange | Orange 1, black 1, orange 1. |
| 4 | Orange, orange | Orange 1, orange 2. |
| 5 | Blue, black, blue | Blue 1, black 1, blue 1. |
| 6 | Blue, white | Blue 1, white 2. |
| 7 | White, orange | White 1, orange 2. |
| 8 | White, black, white | White 1, black 1, white 1. |
| 9 | Blue, blue | Blue 1, blue 2. |
| Stop read | Blue, orange | Blue 1, orange 2. |

3. An electro-optical label reading system according to claim 1 wherein said converter means includes means responsive to coded data from the first stripe of said label to generate a first acceptance gate pulse of a duration substantially equal to that of the longest expected signal pulse train from a coded combination, four temporary storage means wherein the first and second temporary storage means are operative to store coded data from said first or third stripe and wherein the third and fourth temporary storage means are operative to store coded data from said second stripe, integrator means operative to exclude noise pulses from being stored in said temporary storage means, first loading means operative to load data from said first and third stripes into said first and second temporary storage means and operative to erase data stored in said third and fourth temporary storage means, second loading means operative to load data from said second stripe into said third and fourth temporary storage means, gating means operative to generate a shift pulse upon the coincidence of said first acceptance gate and the trailing edge of said data from said second stripe in a two-stripe combination or the coincidence of said acceptance gate and the trailing edge of said data from said third stripe in a three-stripe combination, and inhibit means operative to prevent more than one shift pulse from occurring within a fixed period of time.

4. An electro-optical label reading system including a label representing coded data and including a vertical array of substantially parallel horizontally oriented retroreflective stripes, said stripes being of four different colors and arranged in first and second code formats, said first code format including two-stripe combinations and said second code format including three-stripe combinations, apparatus for optically scanning said label, sensors operative in response to light from said label to produce signal pulses representative of said coded data, means for processing said signal pulses to decode the data content thereof, and means for converting the signal pulses representative of said three-stripe combinations to the same format as the signal pulses representative of the two-stripe combinations.

5. The invention according to claim 4 wherein said stripes are arranged in first and second selected combinations of orange, blue, white and black stripes, said first selected combinations being two-stripe combinations of orange, blue or white stripes with the first stripe of each two-stripe combination being one unit high and the second stripe of each combination being two units high, said second selected combinations being three-stripe combinations of orange, blue, white or black stripes, each stripe being of equal height and the second stripe of each three-stripe combination being black.

6. An electro-optical label reading system according to claim 3 wherein said temporary storage means includes multivibrator binary registers and wherein said first and second loading means are one-shot multivibrators.

7. An electro-optical label reading system according to claim 3 wherein said inhibit means includes first and second one-shot multivibrators operative to generate delay pulses, an OR gate operative to receive and pass said delay pulses to thereby inhibit said gating means and wherein said integrator means is a Schmitt integrator.